(12) United States Patent
Tokuyama et al.

(10) Patent No.: US 12,706,530 B2
(45) Date of Patent: Aug. 11, 2026

(54) POWER CONVERSION DEVICE

(71) Applicant: HITACHI ASTEMO, LTD., Hitachinaka (JP)

(72) Inventors: Takeshi Tokuyama, Tokyo (JP); Masahiro Seo, Tokyo (JP); Takahiro Araki, Tokyo (JP); Shigehisa Aoyagi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 184 days.

(21) Appl. No.: 18/702,542

(22) PCT Filed: Oct. 5, 2022

(86) PCT No.: PCT/JP2022/037325
§ 371 (c)(1),
(2) Date: Apr. 18, 2024

(87) PCT Pub. No.: WO2023/068057
PCT Pub. Date: Apr. 27, 2023

(65) Prior Publication Data

US 2024/0413746 A1 Dec. 12, 2024

(30) Foreign Application Priority Data

Oct. 22, 2021 (JP) ................................. 2021-173081

(51) Int. Cl.
*H02M 1/34* (2007.01)
*H02M 3/00* (2006.01)
*H02M 7/00* (2006.01)

(52) U.S. Cl.
CPC ........... *H02M 3/003* (2021.05); *H02M 1/346* (2021.05); *H02M 7/003* (2013.01)

(58) Field of Classification Search
CPC ...... H02M 3/003; H02M 1/346; H02M 7/003; H02M 3/155; H02M 7/48; H01L 25/115
See application file for complete search history.

(56) References Cited

U.S. PATENT DOCUMENTS

2006/0119512 A1 6/2006 Yoshimatsu et al.
2008/0237851 A1 10/2008 Morita et al.
(Continued)

FOREIGN PATENT DOCUMENTS

JP 2006-190972 A 7/2006
JP 2008-244242 A 10/2008
(Continued)

OTHER PUBLICATIONS

International Search Report and Written Opinion in corresponding International Application No. PCT/JP2022/037325, dated Dec. 20, 2022 (13 pages).

*Primary Examiner* — Crystal L Hammond
*Assistant Examiner* — Jonathan Walter Soileau
(74) *Attorney, Agent, or Firm* — Foley & Lardner LLP

(57) ABSTRACT

A power conversion device includes a substrate on which DC wiring and AC wiring are formed, and a plurality of circuit bodies that are electrically connected in parallel and have a first terminal and a second terminal each connected to the DC wiring or the AC wiring. The first terminals and the second terminals are adjacent to each other in the circuit bodies and protrude in a same direction, and the plurality of circuit bodies are disposed such that the first terminals and the second terminals are alternately arranged side by side on the substrate.

6 Claims, 14 Drawing Sheets

(56) References Cited

U.S. PATENT DOCUMENTS

| | | | |
|---|---|---|---|
| 2015/0023081 | A1 | 1/2015 | Obiraki et al. |
| 2024/0040702 | A1 | 2/2024 | Tokuyama et al. |

FOREIGN PATENT DOCUMENTS

| | | | | |
|---|---|---|---|---|
| JP | 6062404 | B2 | | 1/2017 |
| JP | 2020061831 | A | * | 4/2020 |
| WO | WO-2014/136335 | A1 | | 9/2014 |
| WO | WO-2022/145097 | A1 | | 7/2022 |

* cited by examiner

POWER CONVERSION DEVICE

TECHNICAL FIELD

The present invention relates to a power conversion device.

BACKGROUND ART

The following Patent Literature 1 discloses a configuration in which upper and lower arm circuits constituting inverter circuit wiring are symmetrically arranged and positive electrode and negative electrode terminals are alternately arranged and outputted.

CITATION LIST

Patent Literature

Patent Literature 1: Japanese Patent No. 6062404

SUMMARY OF INVENTION

Technical Problem

In view of the conventional configuration, an object of the present invention is to provide a power conversion device that achieves further lower inductance while taking into consideration of the fact that inductance of each mounted chip is insufficiently equalized.

Solution to Problem

A power conversion device includes a substrate on which DC wiring and AC wiring are formed, and a plurality of circuit bodies that are electrically connected in parallel and have a first terminal and a second terminal each connected to the DC wiring or the AC wiring. The first terminals and the second terminals are adjacent to each other in the circuit bodies and protrude in a same direction, and the plurality of circuit bodies are disposed such that the first terminals and the second terminals are alternately arranged side by side on the substrate.

Advantageous Effects of Invention

According to the present invention, it is possible to provide the power conversion device in which inductance is reduced.

BRIEF DESCRIPTION OF DRAWINGS

FIG. 3 is a perspective view cut along line A-A in FIG. 2.

Figure 1:
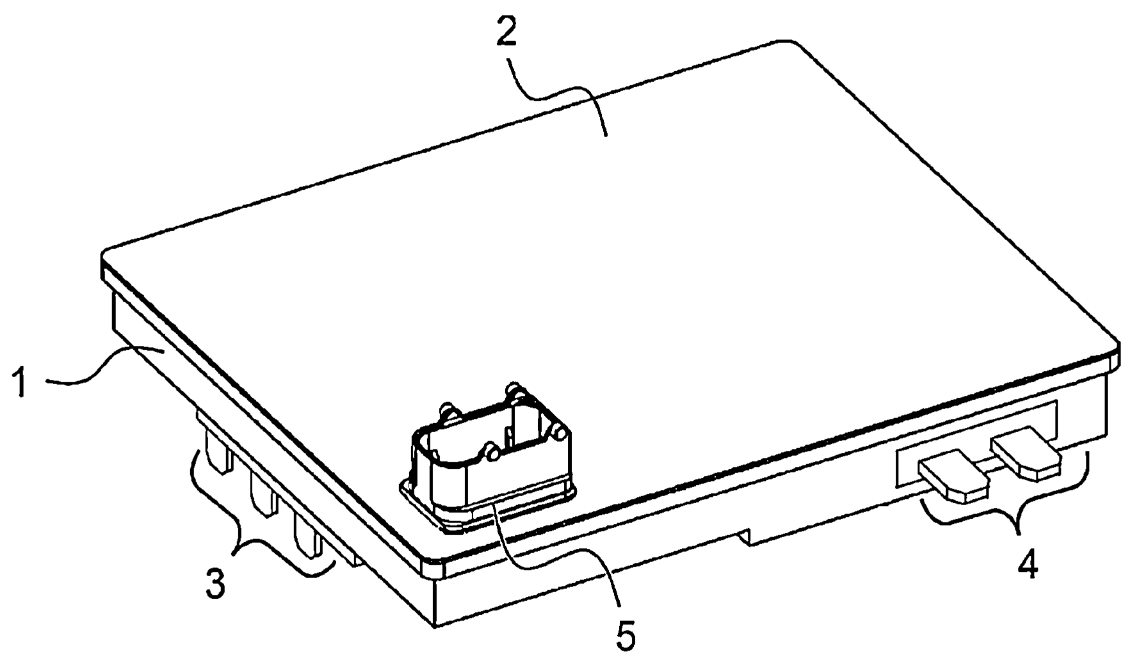
FIG. 1 is an external perspective view of an inverter.

Embodiments of the present invention will be described below with reference to the drawings. The following description and the drawings are examples for describing the present invention. In the following description and the drawings, to clarify the description, omission and simplification are made as appropriate. The present invention can be implemented in other various embodiments. Unless particularly limited, each component may be singular or plural.

The position, the size, the shape, the range, and the like of each component illustrated in the drawings may not present the actual position, the actual size, the actual shape, the actual range, and the like in order to facilitate understanding of the invention. Therefore, the present invention is not always limited to the positions, the sizes, the shapes, the ranges, and the like illustrated in the drawings.

AN EMBODIMENT OF PRESENT INVENTION AND OVERALL CONFIGURATION OF DEVICE

FIG. 1 is an external perspective view of an inverter.

The inside of an inverter housing 1 is sealed by a lid body 2. Cooling water paths and inverter components to be described later are provided in the housing 1. An AC connector 3 and a DC connecter 4 protrude from the inverter housing 1. A signal connector 5 protrudes from the lid body 2.

Figure 2:
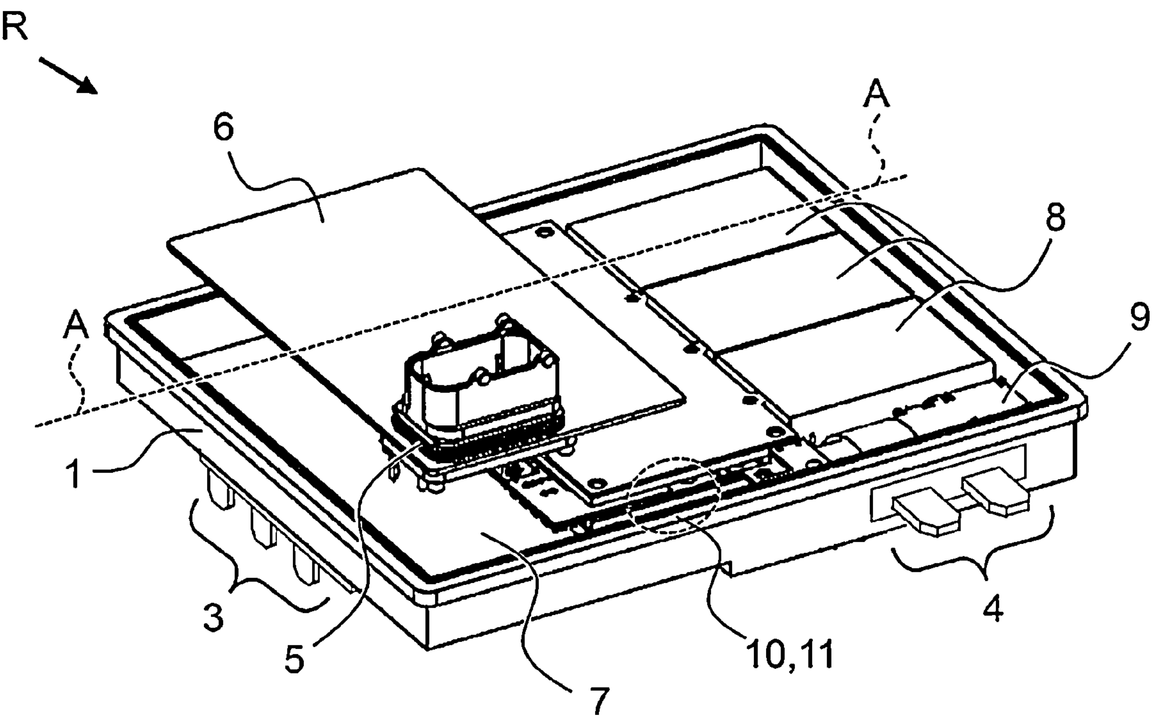
FIG. 2 is an overall perspective view after a lid body is removed.
Figure 3:
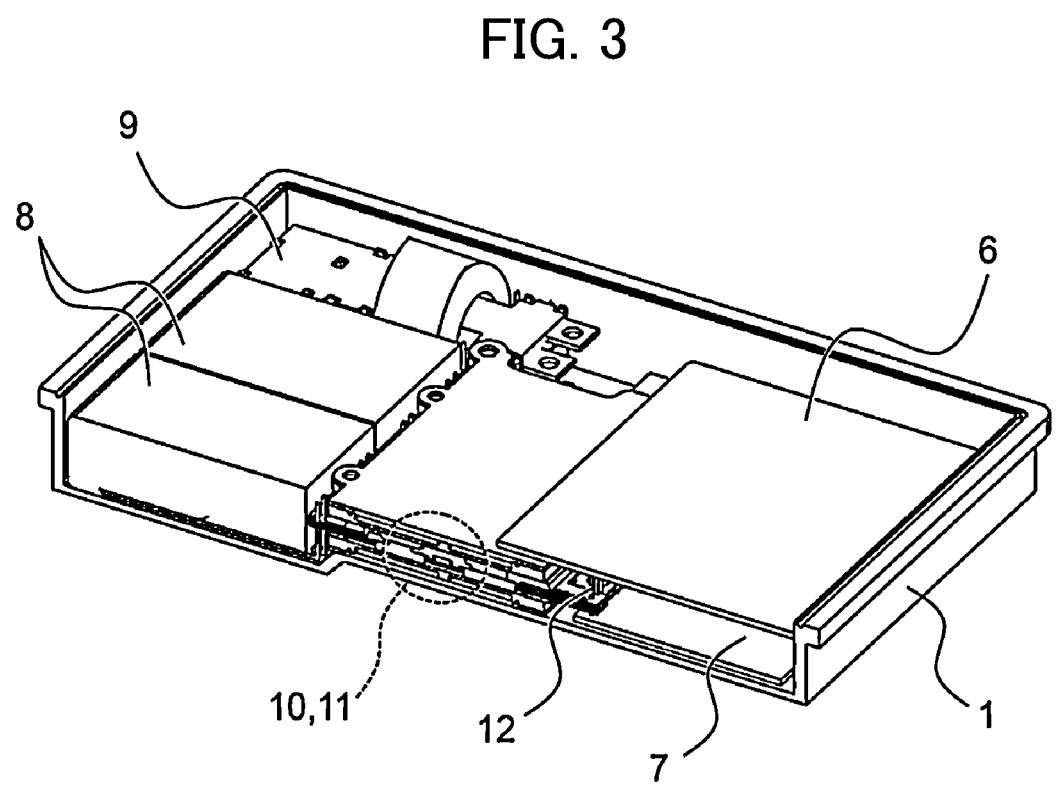
Figure 4:
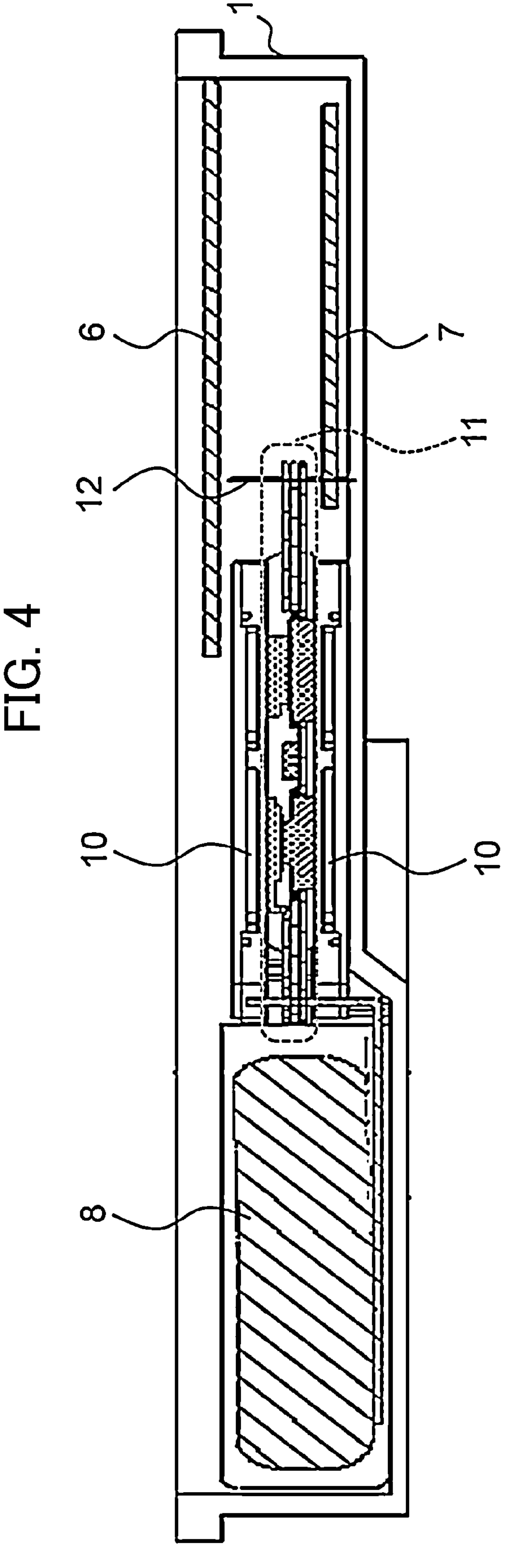
FIG. 4 is a cross-sectional view taken along line A-A in FIG. 3.

FIG. 2 is an overall perspective view after the lid body of the inverter is removed. FIG. 3 is a perspective view cut along line A-A in FIG. 2 as viewed from an R direction. FIG. 4 is a cross-sectional view taken along line A-A in FIG. 2.

In the inverter housing 1, a motor control substrate 6, a gate drive substrate 7, smoothing capacitors 8, an EMC filter 9, the cooling water paths 10, and a main circuit unit 11 (region surrounded by a dotted line in FIG. 4) are disposed. The motor control substrate 6 is disposed above the housing 1 such that the motor control substrate 6 covers the gate drive substrate 7, the cooling water paths 10, and the main circuit unit 11. The signal connector 5 is mounted on the motor control substrate 6 and penetrates through the lid body 2 and protrudes to the outside as described above.

A substrate bonding pin 12 is mounted on the gate drive substrate 7 (see FIG. 4). The substrate bonding pin 12 is electrically connected to a substrate bonding through-hole 22 (see FIG. 6) included in the main circuit unit 11 via a bonding material such as solder. The main circuit unit 11 is sandwiched by and fixed to the cooling water paths 10 in a vertical direction on the paper sheet.

Figure 5:
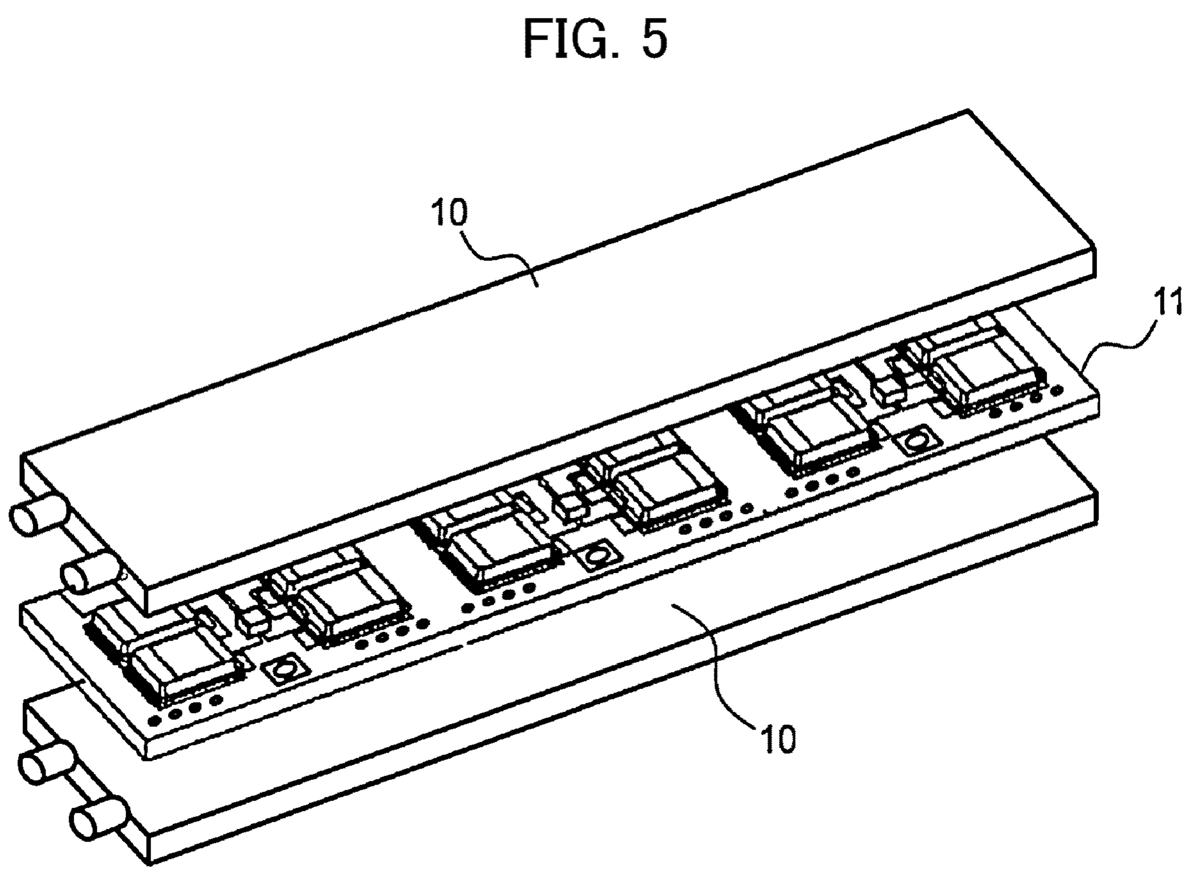
FIG. 5 is an exploded perspective view of a cooling unit and a main circuit unit illustrated in FIG. 4.

FIG. 5 is an exploded perspective view of a cooling unit and the main circuit unit illustrated in FIG. 4.

The main circuit unit 11 includes power semiconductor elements and part main circuit wiring mounted on a plurality of lead packages, and each element and the circuit wiring are cooled by being sandwiched by and fixed to the cooling water paths 10.

Figure 6:
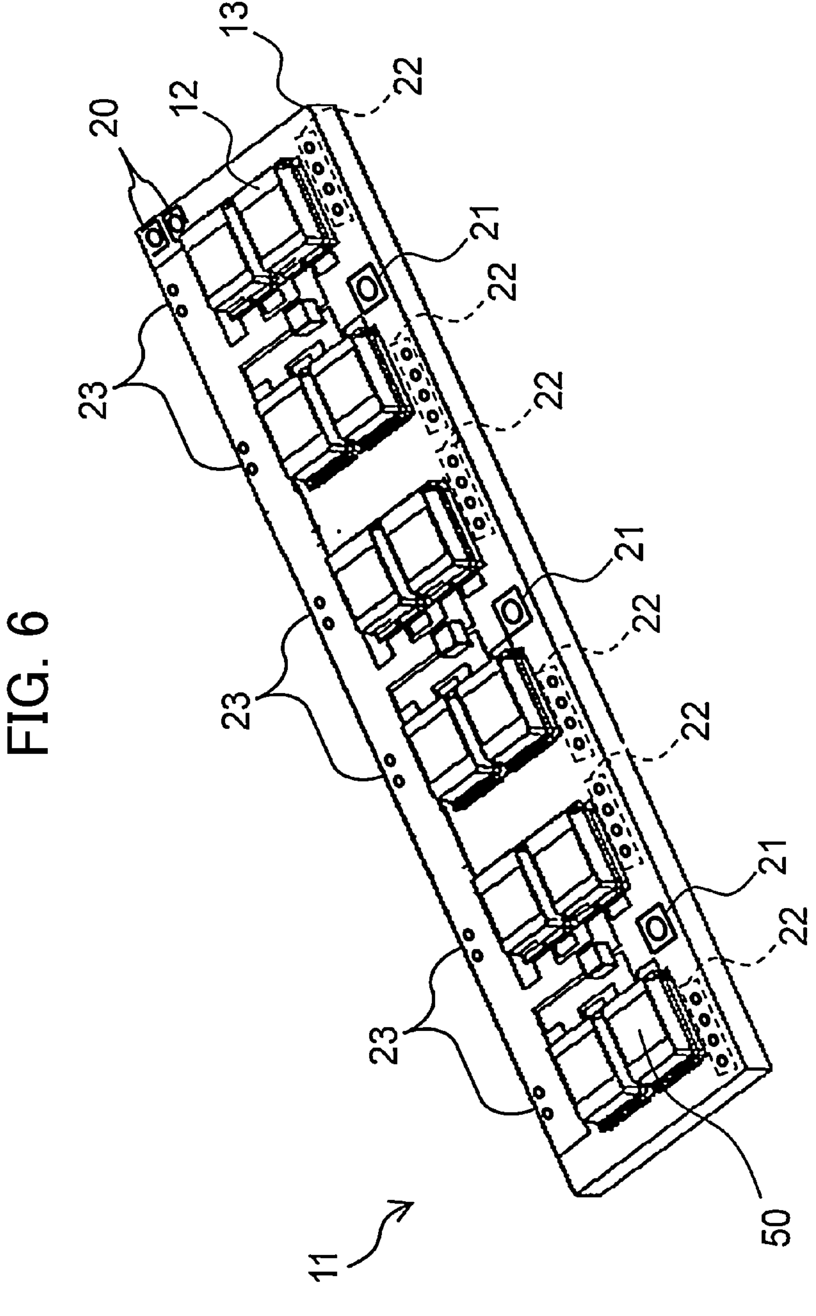
FIG. 6 is a perspective view of the main circuit unit illustrated in FIG. 5.

FIG. 6 is a perspective view of the main circuit unit illustrated in FIG. 5.

The main circuit unit 11 includes a plurality of transfer molded circuit bodies 50 (small molded packages) mounted on a main circuit printed substrate 13. In the main circuit unit 11, the 12 circuit bodies 50 are provided such that two circuit bodies 50 are present in an upper arm and a lower arm for each phase of three-phase AC power outputted by the inverter. However, the number of circuit bodies 50 provided in the main circuit unit 11 is not limited thereto, and an arbitrary number of circuit bodies 50 may be used to constitute the main circuit unit 11.

On the main circuit printed substrate 13, a DC connection unit 20 and an AC connection unit 21 are formed, and electrically bonded by screwing an AC bus bar connected to the AC connector 3 described above with reference to FIG. 2 and DC bus bars connected to the DC connector 4 described above with reference to FIG. 2 to the AC connector 3 and the DC connector 4. In addition, substrate bonding through-holes 22 and capacitor bonding through-holes 23 are formed in the main circuit unit 11, and electrically connected to the above-described gate drive substrate 7, the smoothing capacitors 8, and the like via a bonding material such as solder. The gate drive substrate 7 is electrically connected to control signal terminals 36 of the circuit bodies 50 described later, and the smoothing capacitors 8 are electrically connected to a DC positive electrode wiring pattern 14 and a DC negative electrode wiring pattern 15 described later.

Figure 7:
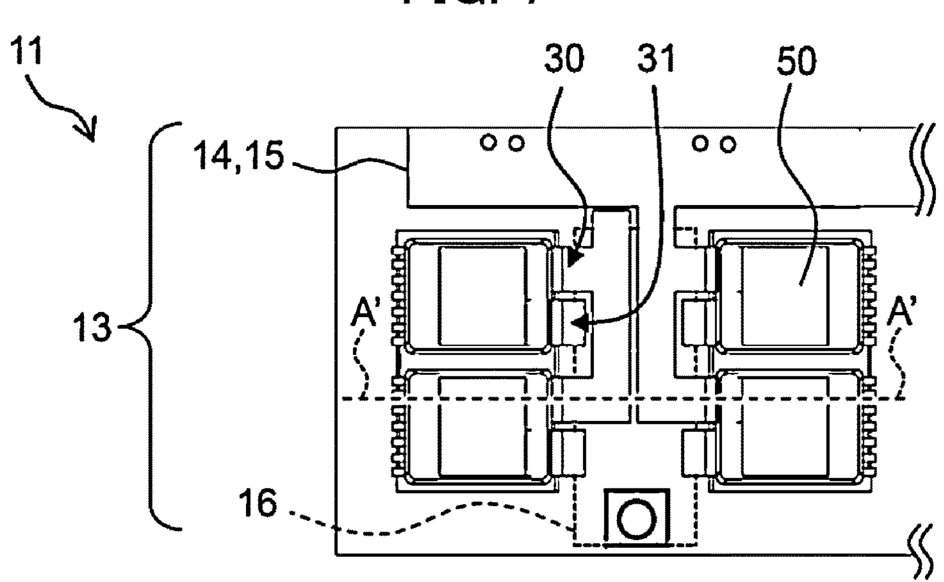
FIG. 7 is a partially enlarged view of a semiconductor module section illustrated in FIG. 6 according to an embodiment of the present invention.
Figure 8:
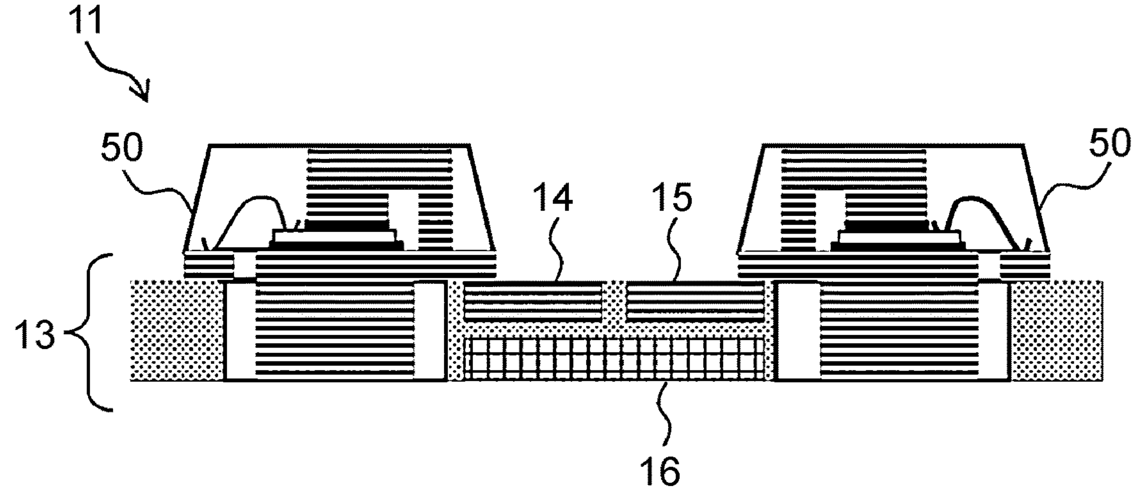
FIG. 8 is a cross-sectional view taken along line A'-A' in FIG. 7.
Figure 9:
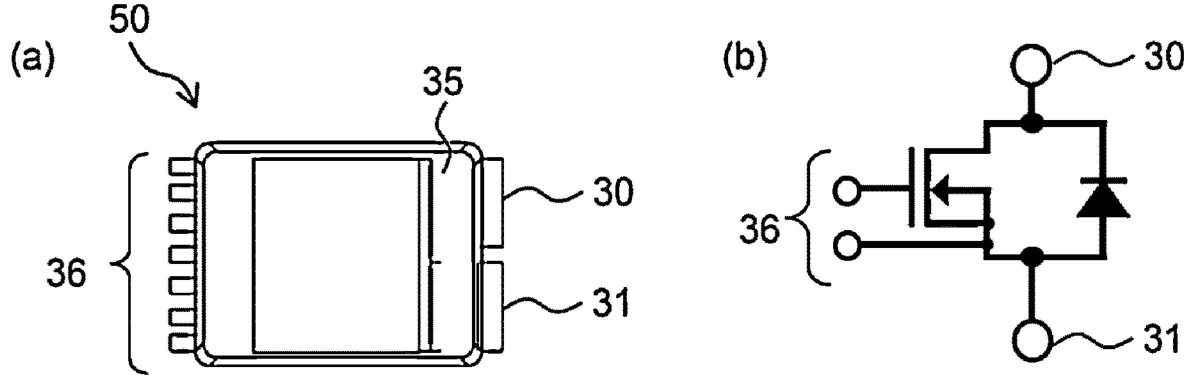
FIG. 9 is an enlarged view and an electrical circuit diagram of a circuit body in FIG. 7.

FIG. 7 is a partially enlarged view of a semiconductor module section illustrated in FIG. 6 according to an embodiment of the present invention. FIG. 8 is a cross-sectional view taken along line A'-A' in FIG. 7. FIG. 9(*a*) is an enlarged view of the circuit body in FIG. 7, and FIG. 9(*b*) is an electrical circuit diagram of the circuit body.

Each of the circuit bodies 50 of the main circuit unit 11 includes a SiC-MOS element, a first terminal 30, a second terminal 31, and the control signal terminal 36. The circuit bodies 50 are disposed on the main circuit printed substrate 13. The DC positive electrode wiring pattern 14 (rear) and the DC negative electrode wiring pattern 15 (front) that serve as the DC bus bars, and an AC wiring pattern 16 serving as the AC bus bar are formed in upper and lower parts of the main circuit printed substrate 13.

In the main circuit printed substrate 13, the DC positive electrode wiring pattern 14 and the DC negative electrode wiring pattern 15 overlap each other in a thickness direction of the main circuit printed substrate 13 in an upper region of FIG. 7. In the region, the DC negative electrode wiring pattern 15 is on the front side (front side) of the paper sheet of FIG. 7, and the DC positive electrode wiring pattern 14 is on the back side (front side) of the paper sheet of FIG. 7. Meanwhile, in a region between the circuit bodies 50 on the lower side of FIG. 7, the DC positive electrode wiring pattern 14 and the DC negative electrode wiring pattern 15 are formed side by side in a surface direction of the main circuit printed substrate 13 and overlap the AC wiring pattern 16. In the region, the AC wiring pattern16 is formed wider than the DC positive electrode wiring pattern 14 and the DC negative electrode wiring pattern 15 in the main circuit printed substrate 13. In addition, portions of the AC wiring pattern 16 that do not overlap the DC positive electrode wiring pattern 14 and the DC negative electrode wiring pattern 15 are formed on front and rear surfaces of the main circuit printed substrate 13, and currents in the portions flow in opposite directions.

As illustrated in FIG. 9(*a*), each of the circuit bodies 50 has a side surface from which the control signal terminal 36 protrudes, and a side surface on which the first terminal 30 and the second terminal 31 are arranged adjacent to each other and protrude to the outside in the same direction, and is sealed by a molded resin 35. As illustrated in FIG. 9(*b*), the first terminal 30 and the second terminal 31 correspond to a drain terminal and a source terminal of the N-channel SiC-MOS element, respectively. In each of the circuit bodies 50 of the upper arm, the first terminal 30 is connected to the DC positive electrode wiring pattern 14, and the second terminal 31 is connected to the AC wiring pattern 16. Meanwhile, in each of the circuit bodies 50 of the lower arm, the first terminal 30 is connected to the AC wiring pattern 16, and the second terminal 31 is connected to the DC negative electrode wiring pattern. The electrical circuit diagram of the circuit body 50 illustrated in FIG. 9(*b*) is an example and is not limited thereto. For example, the first terminal 30 and the second terminal 31 may be replaced with each other, and a P-channel SiC-MOS element may be used in place of the N-channel SiC-MOS element.

As illustrated in FIG. 7, in the main circuit unit 11, the circuit bodies 50 forming each pair are arranged opposite to each other on the main circuit printed substrate 13 with the DC positive electrode wiring pattern 14, the DC negative electrode wiring pattern 15, and the AC wiring pattern 16 interposed between the circuit bodies 50 and on the both sides of each wiring pattern. In addition, the circuit bodies 50 forming each pair are disposed such that the first terminals 30 and the second terminals 31 are alternately arranged side by side on the wiring pattern side. The two circuit bodies 50 arranged on the left side of FIG. 7 are electrically connected in parallel to constitute the upper arm by connecting the first terminal 30 and the second terminal 31 of each of the circuit bodies 50 to the DC positive electrode wiring pattern 14 and the AC wiring pattern 16, respectively. Meanwhile, the two circuit bodies 50 arranged on the right side of FIG. 7 are electrically connected in parallel to constitute the lower arm by connecting the first terminal 30 and the second terminal 31 of each of the circuit bodies 50 to the AC wiring pattern 16 and the DC negative electrode wiring pattern 15, respectively. In a case where the main circuit unit 11 includes three sets of the circuit bodies 50 described above, the inverter that converts DC power into three-phase AC power is configured. A direction (vertical direction in FIG. 7) in which the first terminals 30 and the second terminals 31 of the circuit bodies 50 are arranged is orthogonal to a longitudinal direction (horizontal direction in FIG. 7) of the DC positive electrode wiring pattern 14 and the DC negative electrode wiring pattern 15.

Thus, currents flow in opposite directions in the first terminal 30 and the second terminal 31 of each of the circuit bodies 50, currents flow in opposite directions in the first terminal 30 of one of the circuit bodies 50 adjacent to each other and the second terminal 31 of the other of the circuit bodies 50 adjacent to each other, and thus magnetic fields generated by the currents can cancel each other. Therefore, with the above-described stacked structure of the DC positive electrode wiring pattern 14 and the DC negative electrode wiring pattern 15 in the main circuit printed substrate 13, it is possible to reduce inductance by the effect that the magnetic fields cancel each other.

Figure 10:
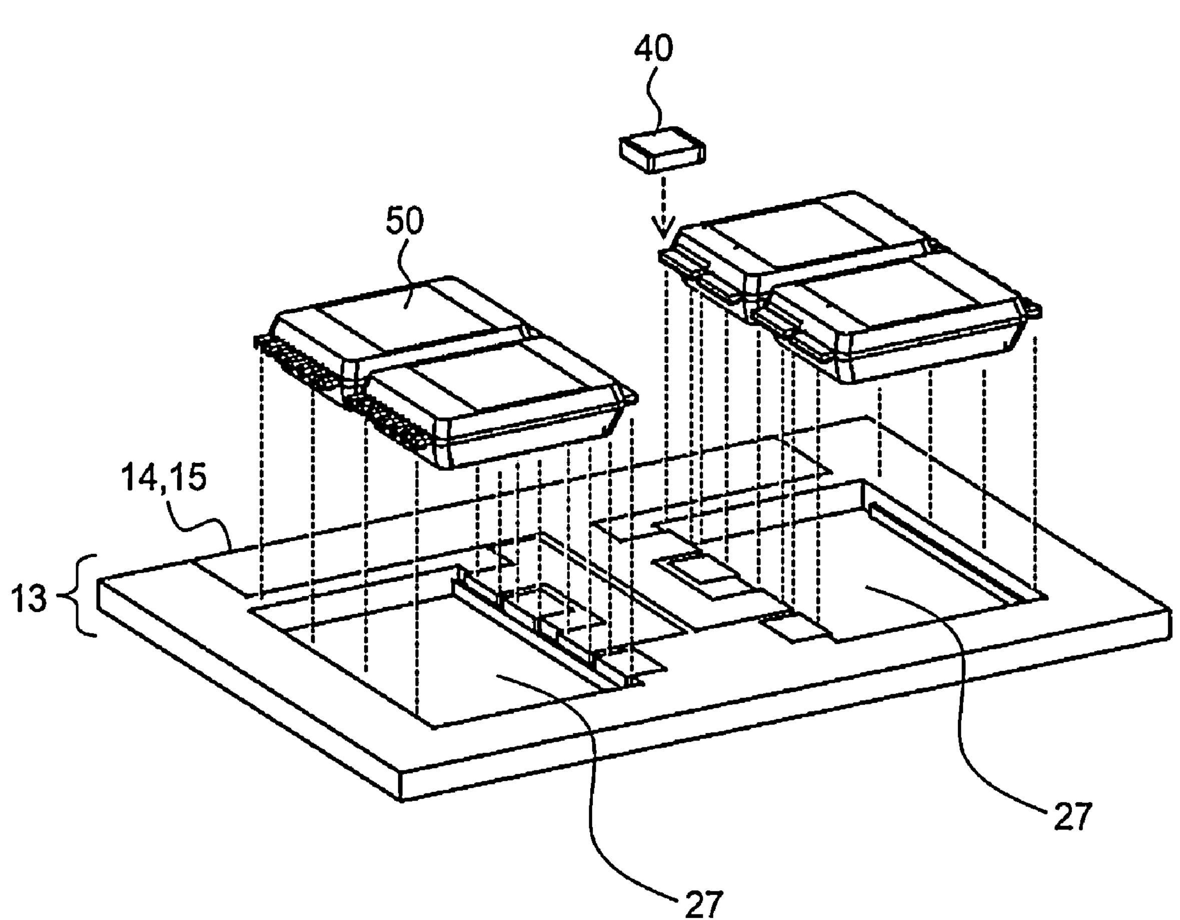
FIG. 10 is an assembly view of the main circuit unit in FIG. 6.
Figure 11:
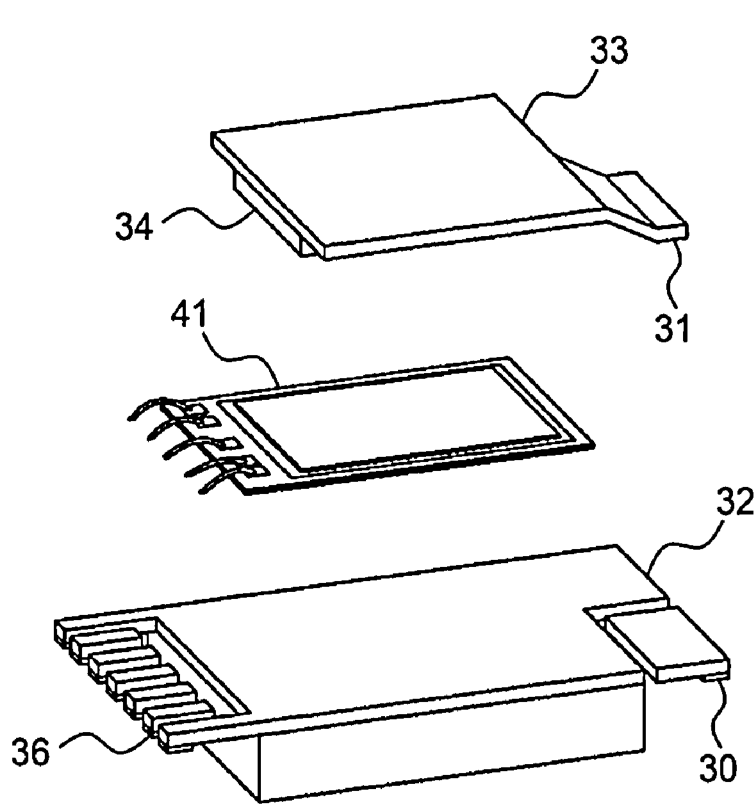
FIG. 11 is an exploded diagram of the circuit body.

FIG. 10 is an assembly diagram of the main circuit unit illustrated in FIG. 6. FIG. 11 is an exploded diagram of the circuit body.

The circuit bodies 50 of each of the upper and lower arms are inserted into the through-holes 27 formed in the main circuit printed substrate 13 and connected to the DC positive electrode wiring pattern 14 and the DC negative electrode wiring pattern 15, whereby a card-type inverter structure is formed. In addition, a snubber capacitor 40 is disposed between the inserted circuit bodies 50 on the substrate 13.

Each of the circuit bodies 50 includes the SiC-MOS element 41 between a first lead frame 32 having the control signal terminal 36 and the first terminal 30 and a second lead frame having the second terminal 31 and a pedestal electrode 34, and is entirely sealed by transfer molding. The pedestal electrode 34 is provided to be electrically connected to a surface electrode of the SiC-MOS element 41 while the second lead frame 33 has an insulation distance from the first lead frame 32.

When the circuit body 50 is inserted in the through-hole 27, a heat dissipation surface of the circuit body 50 is exposed from a back face of the through-hole 27. Therefore, the SiC-MOS element 41 radiates heat from both surface electrodes via the lead frames 32 and 33.

Figure 12:
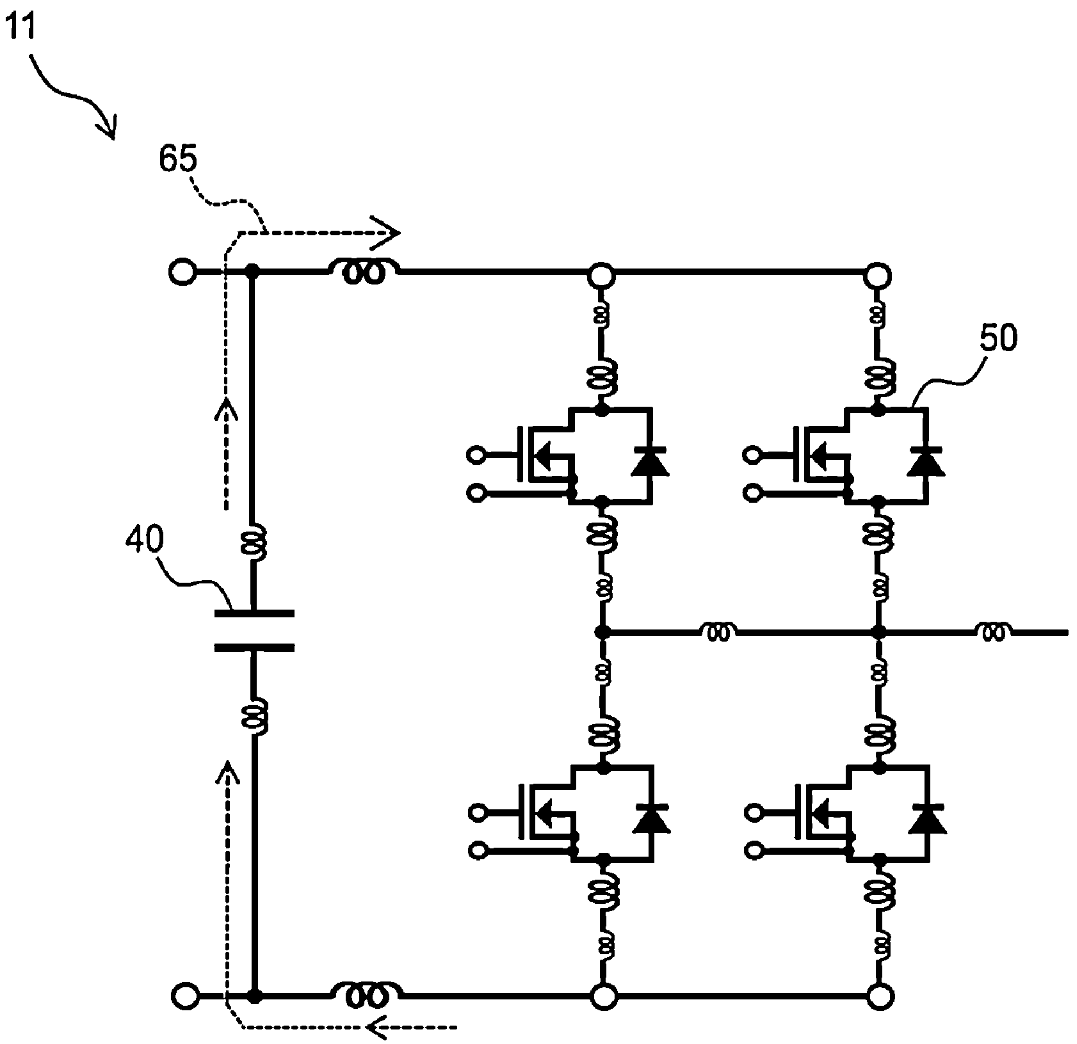
FIG. 12 is an electrical circuit diagram of the main circuit unit.

FIG. 12 is an electrical circuit diagram of the main circuit unit. FIG. 12 illustrates an electrical circuit diagram of upper and lower arm circuits for a single phase among upper and lower arm circuits for three phases in the main circuit unit 11.

A transient current 65 generated at the time of switching flows in an electrical circuit of the main circuit unit 11. Conventionally, mass production of inverters has been made possible by using circuit bodies 50 as small packages and omitting a joint by integrating a substrate and a main circuit wiring. However, to improve a switching speed by connecting the circuit bodies 50 in parallel, a further reduction in inductance is required to balance current of a transient current 65, reduce a surge voltage, and reduce a loss.

Therefore, in the present invention, as described above, the first terminals 30 and the second terminals 31 of the two circuit bodies 50 connected in parallel are alternately arranged side by side in the upper and lower arms, and the first terminals 30 and the second terminals 31 of the circuit bodies 50 of the upper arm and the first terminals 30 and the second terminals 31 of the circuit bodies 50 of the lower arm are arranged opposite to each other with the DC positive electrode wiring pattern 14, the DC negative electrode wiring pattern 15, and the AC wiring pattern 16 interposed therebetween. Therefore, it is possible to reduce inductance of a drain/source terminal section in which the inductance is the highest in each circuit body 50. According to an experimental result, conventionally, it was 5 nH per circuit body (1 PKG), but it was found that it was possible to reduce it to 2 nH per circuit body (1 PKG) by implementing the embodiment of the present invention.

In the above-described embodiment, an example is explained in which each of the upper and lower arms of the inverter is configured by the two circuit bodies 50 connected in parallel, but the number of circuit bodies 50 connected in parallel is not limited to 2 and can be increased. In this case, a structure can be provided in which a circuit arrangement similar to that illustrated in FIG. 7 is used, the drain and source terminals of each of the circuit bodies 50 of the upper arm and the drain and source terminals of each of the circuit bodies 50 of the lower arm are arranged opposite to each other, the drain and source terminals of the circuit bodies 50 connected in parallel in each of the upper and lower arms are alternately arranged to be aligned, and each connected to the corresponding wiring pattern. Thus, the circuit bodies 50, which are small SiC chips, are laid out such that switching transient currents flow in opposite directions, while having an advantage that the circuit bodies 50 are arranged in parallel in a plurality of lines. Therefore, as the number of lines in which the elements are arranged in parallel is increased, wiring inductance can be reduced.

(Modification 1)

Figure 13:
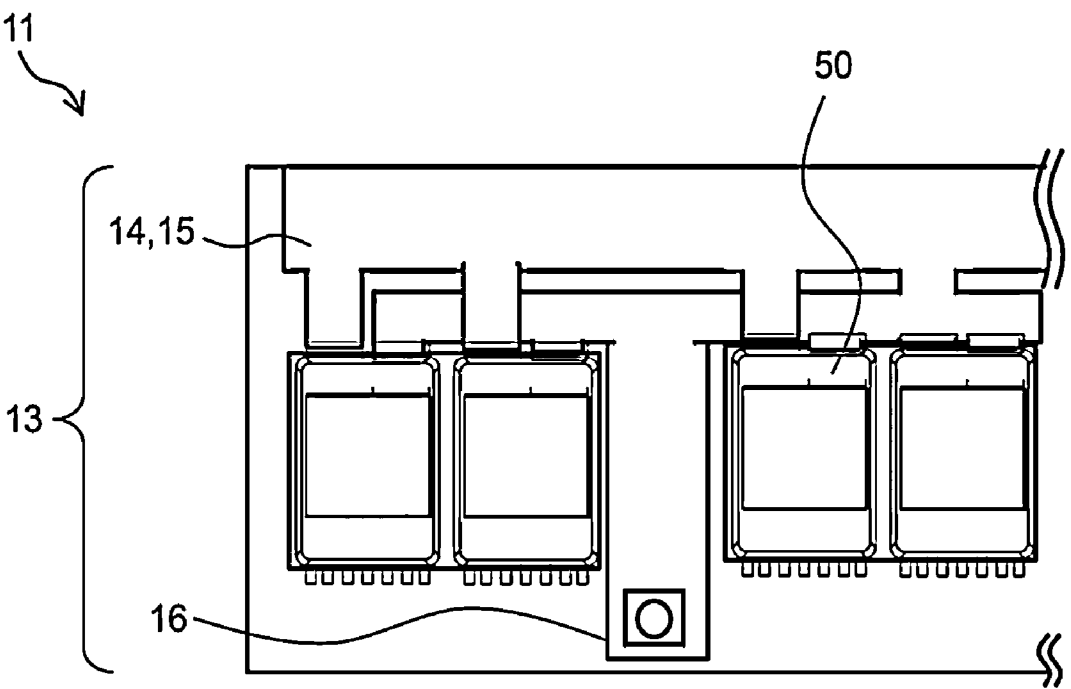
FIG. 13 illustrates modification 1.

FIG. 13 is a diagram illustrating a first modification of the present invention and corresponds to FIG. 7.

Differently from the arrangement of the circuit bodies 50 illustrated in FIG. 7, in the arrangement of the circuit bodies 50 according to the first modification illustrated in FIG. 13, a direction in which the first terminals 30 and the second terminals 31 of the circuit bodies 50 are arranged is parallel to a horizontal direction in FIG. 13, that is, a longitudinal direction (horizontal direction in FIG. 13) of the DC positive electrode wiring pattern 14 and the DC negative electrode wiring pattern 15. Even in this arrangement, it is possible to obtain an effect of reducing wiring inductance as described above.

(Modification 2)

Figure 14:
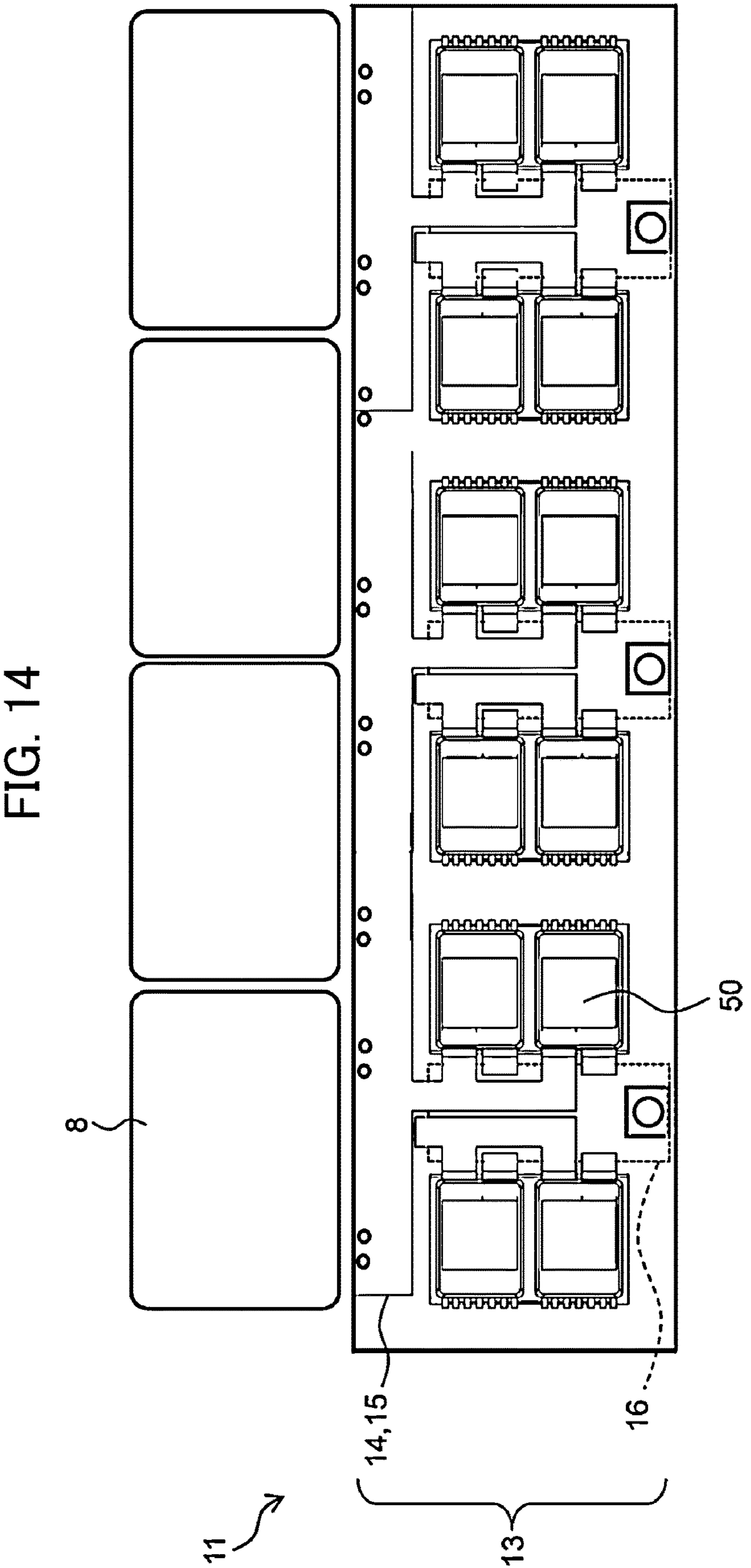
FIG. 14 illustrates modification 2.

FIG. 14 is a diagram illustrating a second modification of the present invention and corresponds to FIG. 6.

In the above-described embodiment, as can be seen from FIGS. 2 and 3, the plurality of smoothing capacitors 8 are arranged side by side such that a long side of each of the smoothing capacitors 8 is orthogonal to the longitudinal direction (longitudinal direction of the DC positive electrode wiring pattern 14 and the DC negative electrode wiring pattern 15) of the main circuit unit 11. Meanwhile, in the second modification illustrated in FIG. 14, the plurality of smoothing capacitors 8 are arranged side by side such that the long side of each of the smoothing capacitors 8 is parallel to the longitudinal direction of the main circuit unit 11. In this case, a dimension in a vertical direction in FIG. 14 can be smaller than that in FIG. 6, and thus it is possible to further downsize the inverter.

(Modification 3)

Figure 15:
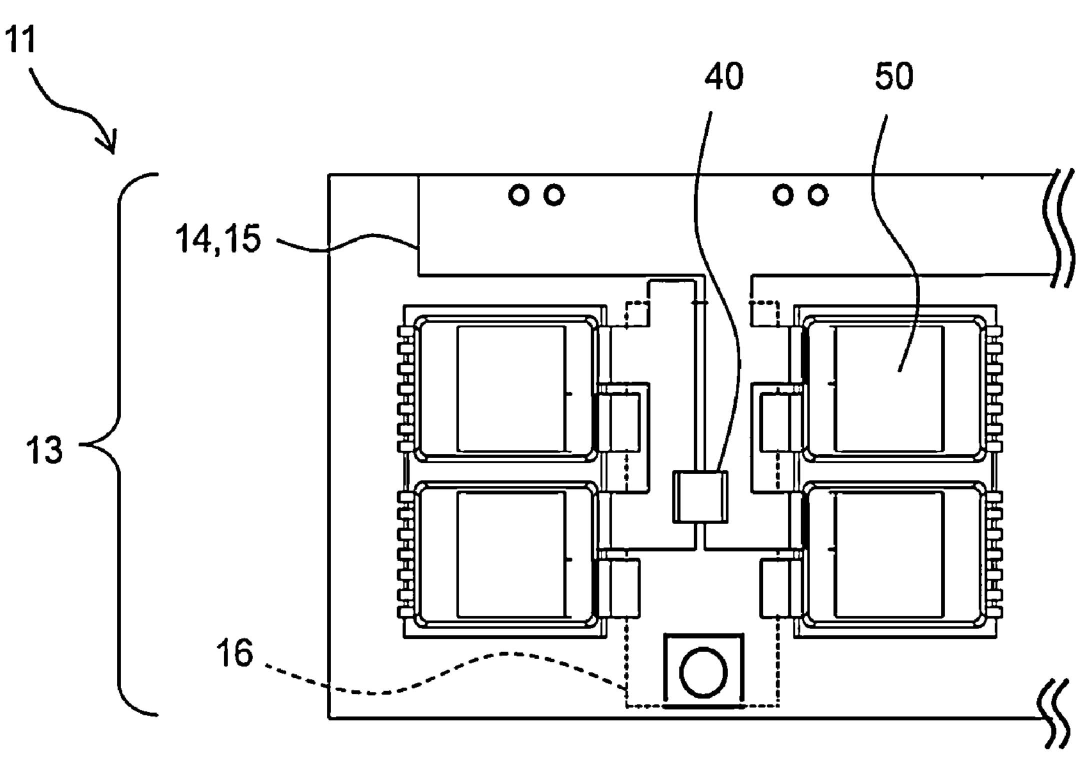
FIG. 15 illustrates modification 3.

FIG. 15 is a diagram illustrating a third modification of the present invention and corresponds to FIG. 7.

In the main circuit unit 11, the snubber capacitor 40 is disposed between the circuit bodies 50 on the upper arm circuit side and the circuit bodies 50 on the lower arm circuit side. The snubber capacitor 40 is connected to the DC positive electrode wiring pattern 14 and the DC negative electrode wiring pattern 15.

(Modification 4)

Figure 16:
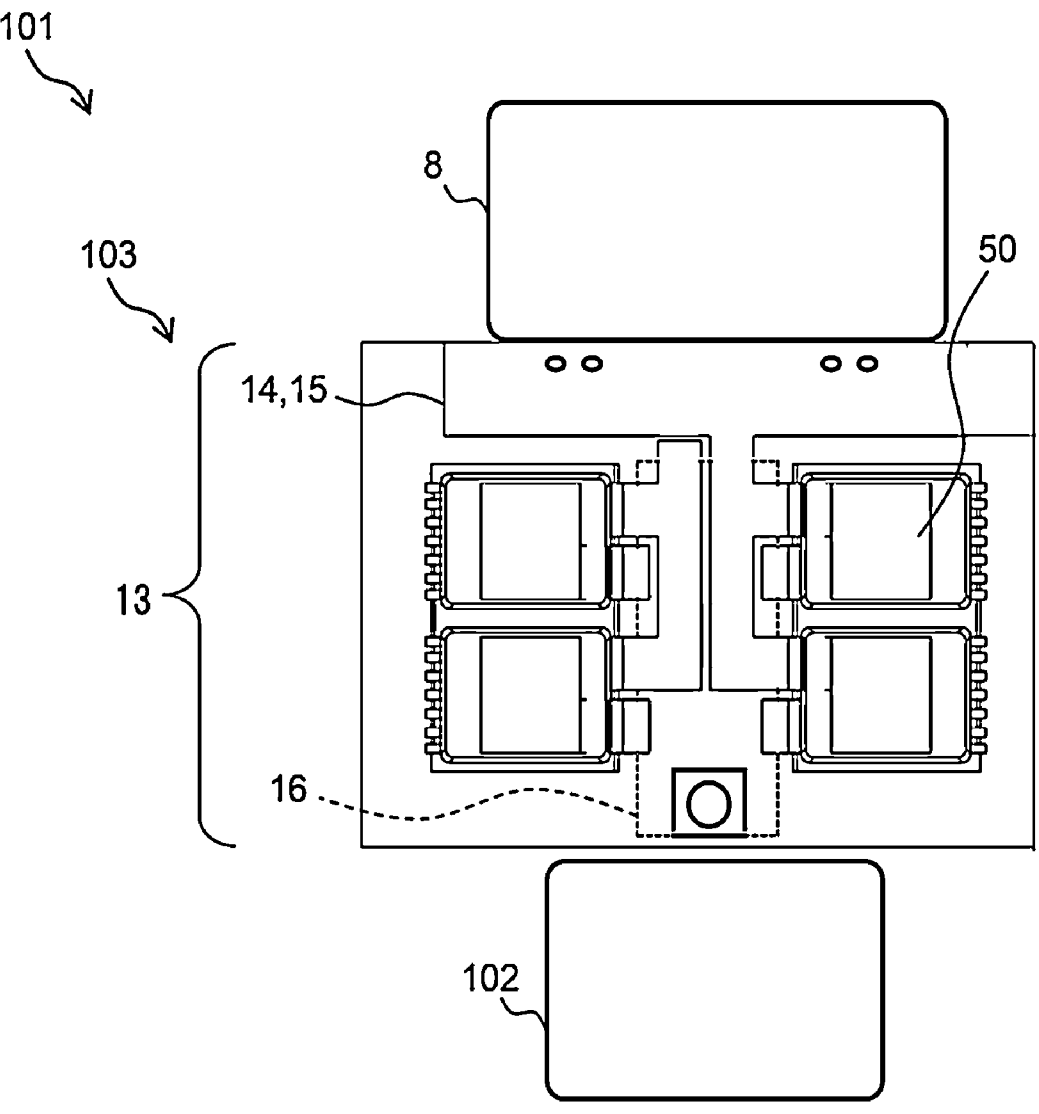
FIG. 16 illustrates modification 4.

FIG. 16 is a diagram illustrating a fourth modification of the present invention and corresponds to FIG. 7.

The embodiment of the present invention can be applied to a boost converter 101. In the boost converter 101, a boost circuit unit 103 has a similar configuration to that of the main circuit unit 11 according to the above-described embodiment. The boost converter 101 is constituted by the boost circuit unit 103, the smoothing capacitor elements 8 electrically connected to the DC positive electrode wiring pattern 14 and the DC negative electrode wiring pattern 15, and boost reactors 102 electrically connected to the AC wiring pattern 16.

FIG. 16 illustrates only one smoothing capacitor element 8 and one boost reactor 102 for omission. However, actually, in a longitudinal direction of the boost circuit unit 103, the plurality of smoothing capacitor elements 8 are arranged side by side and the plurality of boost reactors 102 are arranged side by side. In this case, as illustrated in FIGS. 2 and 3, the smoothing capacitors 8 may be arranged side by side such that the long side of each of the smoothing capacitors 8 is orthogonal to the longitudinal direction (longitudinal direction of the DC positive electrode wiring pattern 14 and the DC negative electrode wiring pattern 15) of the boost circuit unit 103. Alternatively, as described with reference to FIG. 14, the smoothing capacitors 8 may be arranged side by side such that the long side of each of the smoothing capacitors 8 is parallel to the longitudinal direction (longitudinal direction of the DC positive electrode wiring pattern 14 and the DC negative electrode wiring pattern 15) of the boost circuit unit 103. The same applies to the boost reactors 102. Therefore, even in the boost converter 101, it is possible to obtain an effect similar to a reduction in the inductance of the inverter described in the embodiment of the present invention.

According to the above-described embodiment of the present invention, the following effects are obtained.

(1) A power conversion device includes a substrate 13 on which DC wiring and AC wiring are formed, and a plurality of circuit bodies 50 that are electrically connected in parallel and each have a first terminal 30 and a second terminal 31 each connected to the DC wiring or the AC wiring. The first terminals 30 and the second terminals 31 are adjacent to each other in the circuit bodies 50 and protrude in a same direction, and the plurality of circuit bodies 50 are disposed such that the first terminals 30 and the second terminals 31 are alternately arranged side by side on the substrate 13. In this case, it is possible to provide the power conversion device in which induction is reduced.

(2) The power conversion device may include a first circuit body group of the plurality of circuit bodies 50 electrically connected in parallel and constituting an upper arm and a second circuit body group of the plurality of circuit bodies 50 electrically connected in parallel and constituting a lower arm, and the first circuit body group and the second circuit body group may be arranged opposite to each other on the substrate 13 with the DC wiring and the AC wiring interposed between the first circuit body group and the second circuit body group. In this case, it is possible to reduce the inductance due to the effect that magnetic fields cancel each other.

(3) In the power conversion device, the plurality of circuit bodies 50 may be disposed such that a direction in which the first terminals 30 and the second terminals 31 are arranged is orthogonal to a longitudinal direction of the DC wiring. In this case, a dimension of the substrate 13 in a horizontal direction can be made small.

(4) In the power conversion device, the plurality of circuit bodies 50 may be disposed such that a direction in which the first terminals 30 and the second terminals 31 are arranged is parallel to a longitudinal direction of the DC wiring. In this case, a dimension of the substrate 13 in a vertical direction can be made small.

(5) The power conversion device may further include a plurality of smoothing capacitors 8 each having a long side and a short side and electrically connected to the DC wiring, and the plurality of smoothing capacitors 8 may be arranged side by side such that the long sides are orthogonal or parallel to a longitudinal direction of the DC wiring. In this case, dimensions in the horizontal direction and the vertical direction can be made small.

(6) The power conversion device may further include a snubber capacitor 40 disposed between the first circuit body group and the second circuit body group, and the snubber capacitor 40 may be connected to the DC wiring. In this case, this contributes for a reduction in the inductance.

(7) A boost converter 101 that includes the power conversion device and further includes a smoothing capacitor 8 electrically connected to the DC wiring, and a boost reactor 102 electrically connected to the AC wiring is provided. In this case, it is possible to provide the boost converter 101 in which inductance is reduced.

The present invention is not limited to the above-described embodiment and can be implemented by combining various modifications and other configurations without departing from the scope of the present invention. In addition, the present invention is not limited to including all the configurations described in the above-described embodiment and includes configurations in which some of the configurations are removed.

LIST OF REFERENCE SIGNS

1: inverter housing
2: lid body
3: AC connector
4: DC connector
5: signal connector
6: motor control substrate
7: gate drive substrate
8: smoothing capacitor
9: EMC filter
10: cooling water path
11: main circuit unit
12: substrate bonding pin
13: main circuit printed substrate
14: DC positive electrode wiring pattern
15: DC negative electrode wiring pattern
16: AC wiring pattern
20: DC connection unit
21: AC connection unit
30: first terminal
31: second terminal
32: first lead frame
33: second lead frame
34: pedestal electrode
35: molded resin
36: control signal terminal
40: snubber capacitor (ceramic capacitor)
41: SiC-MOS element
50: circuit body (small molded PKG)
65: transient current
101: boost converter
102: boost reactor
103: boost circuit unit

The invention claimed is:

1. A power conversion device comprising:

a substrate on which DC wiring and AC wiring are formed;

a plurality of circuit bodies that are electrically connected in parallel and each have a first terminal and a second terminal each connected to the DC wiring or the AC wiring;

a first circuit body group including the plurality of circuit bodies electrically connected in parallel and constituting an upper arm; and a second circuit body group including the plurality of circuit bodies electrically connected in parallel and constituting a lower arm, wherein the first circuit body group and the second circuit body group are arranged opposite to each other on the substrate with the DC wiring and the AC wiring interposed between the first circuit body group and the second circuit body group, and wherein the first terminals and the second terminals are adjacent to each other in the circuit bodies and protrude in a same direction, and the plurality of circuit bodies are disposed such that the first terminals and the second terminals are alternately arranged side by side on the substrate.

2. The power conversion device according to claim 1, wherein the plurality of circuit bodies are disposed such that a direction in which the first terminals and the second terminals are arranged is orthogonal to a longitudinal direction of the DC wiring.

3. The power conversion device according to claim 1, wherein the plurality of circuit bodies are disposed such that a direction in which the first terminals and the second terminals are arranged is parallel to a longitudinal direction of the DC wiring.

4. The power conversion device according to claim 1, further comprising a plurality of smoothing capacitors each having a long side and a short side and electrically connected to the DC wiring, wherein the plurality of smoothing capacitors are arranged side by side such that the long sides are orthogonal or parallel to a longitudinal direction of the DC wiring.

5. The power conversion device according to claim 1, further comprising a snubber capacitor disposed between the first circuit body group and the second circuit body group, wherein the snubber capacitor is connected to the DC wiring.

6. A boost converter comprising:

the power conversion device according to claim 1;

a smoothing capacitor electrically connected to the DC wiring; and a smoothing reactor electrically connected to the AC wiring.

* * * * *